(12) United States Patent
Yang et al.

(10) Patent No.: US 10,612,965 B2
(45) Date of Patent: Apr. 7, 2020

(54) LOAD CELL WITH STREAMLINED STRUCTURE AND OVERLOAD PROTECTION

(71) Applicant: Mettler-Toledo GmbH, Greifensee (CH)

(72) Inventors: Chun Yang, Shanghai (CN); Chao Wu, Shanghai (CN); Weixiang Sun, Shanghai (CN); Naifeng Bian, Shanghai (CN); Hans-Rudolf Burkhard, Wila (CH)

(73) Assignee: Mettler-Toledo GmbH, Greifensee (CH)

( * ) Notice: Subject to any disclaimer, the term of this patent is extended or adjusted under 35 U.S.C. 154(b) by 153 days.

(21) Appl. No.: 15/835,514

(22) Filed: Dec. 8, 2017

(65) Prior Publication Data

US 2018/0100760 A1   Apr. 12, 2018

Related U.S. Application Data

(63) Continuation of application No. PCT/EP2016/066237, filed on Jul. 8, 2016.

(30) Foreign Application Priority Data

Jul. 15, 2015   (CN) .......................... 2015 1 0415673
Jul. 15, 2015   (CN) ...................... 2015 2 0512666 U

(51) Int. Cl.
   *G01G 23/00*   (2006.01)
(52) U.S. Cl.
   CPC .................................. *G01G 23/005* (2013.01)
(58) Field of Classification Search
   USPC ....................................................... 177/154
   See application file for complete search history.

(56) References Cited

U.S. PATENT DOCUMENTS

| 4,574,898 A * | 3/1986 | Freeman | G01G 23/005 |
| | | | 177/154 |
| 4,726,435 A * | 2/1988 | Kitagawa | G01G 23/06 |
| | | | 177/154 |

(Continued)

FOREIGN PATENT DOCUMENTS

| EP | 1912048 A1 * | 4/2008 | .......... G01G 23/005 |
| EP | 1912048 A1 | 4/2008 | |

OTHER PUBLICATIONS

Translate EP-1912048-A1 (Year: 2008).*

*Primary Examiner* — Natalie Huls
*Assistant Examiner* — Monica S Young
(74) *Attorney, Agent, or Firm* — Standley Law Group LLP; Jeffrey S. Standley; Stephen L. Grant

(57) ABSTRACT

A load cell is provided with protection against damage from overload. The load cell has a load receiving member, a main member and a load transmitting member. The main member has a movable portion, a fixed portion and a first parallel guiding member for connecting the fixed portion and the movable portion. The load transmitting member has a first mounting portion for mounting the load receiving member, a second mounting portion for mounting the movable portion and a parallel guiding member for connecting the first mounting portion to the second mounting portion. The first mounting portion is movable vertically relative to the second mounting portion when a load being applied on the first mounting portion. The load-transmitting member is a single piece. The load cell also has a stop portion for preventing the first mounting portion from further moving downwardly for overload protection.

10 Claims, 4 Drawing Sheets

(56) References Cited

U.S. PATENT DOCUMENTS

| | | | | |
|---|---|---|---|---|
| 5,721,398 | A * | 2/1998 | Balsen | G01G 23/005 177/184 |
| 7,040,178 | B1 * | 5/2006 | Perkins | G01G 23/005 73/856 |
| 2002/0038729 | A1 * | 4/2002 | Watabiki | G01G 21/244 177/229 |
| 2005/0081641 | A1 * | 4/2005 | Loher | G01G 3/1414 73/856 |
| 2009/0151474 | A1 * | 6/2009 | Mehus | G01G 3/14 73/862.52 |
| 2009/0283337 | A1 * | 11/2009 | Haefeli | G01G 3/1412 177/180 |
| 2013/0106076 | A1 * | 5/2013 | Zaagman | B60D 1/015 280/438.1 |
| 2013/0269449 | A1 * | 10/2013 | Nagai | G01G 23/005 73/862.382 |
| 2014/0262557 | A1 * | 9/2014 | Johnson | G01G 3/14 177/211 |
| 2015/0292965 | A1 * | 10/2015 | Sato | G01L 1/2262 73/818 |
| 2018/0098900 | A1 * | 4/2018 | Sato | A61G 7/0527 |

* cited by examiner

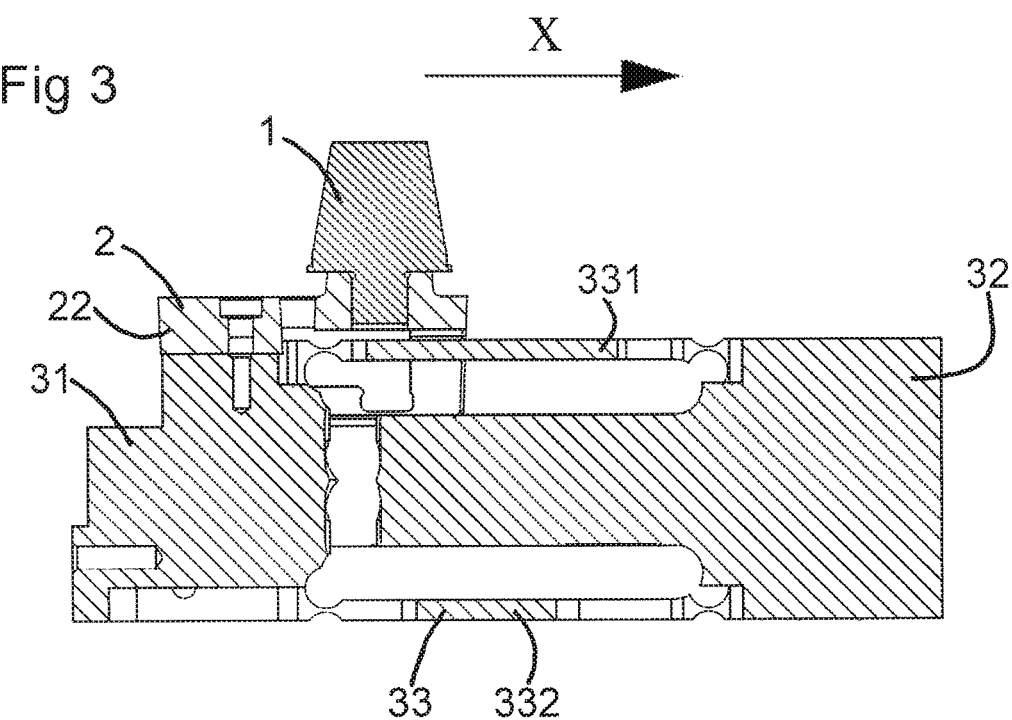
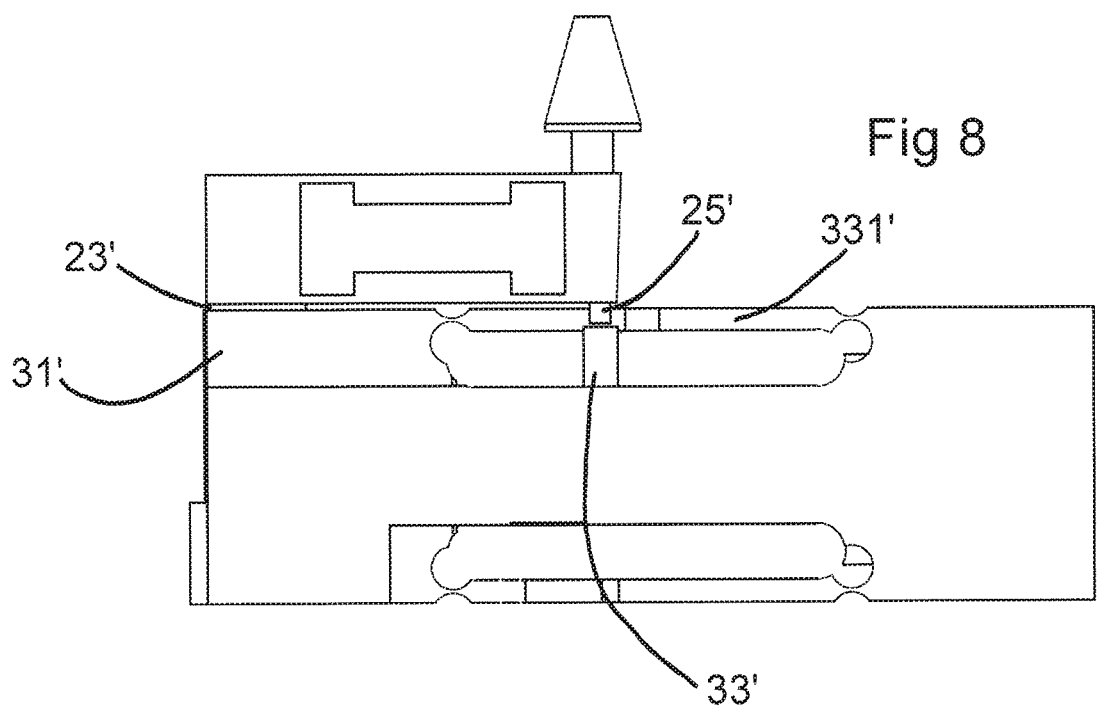

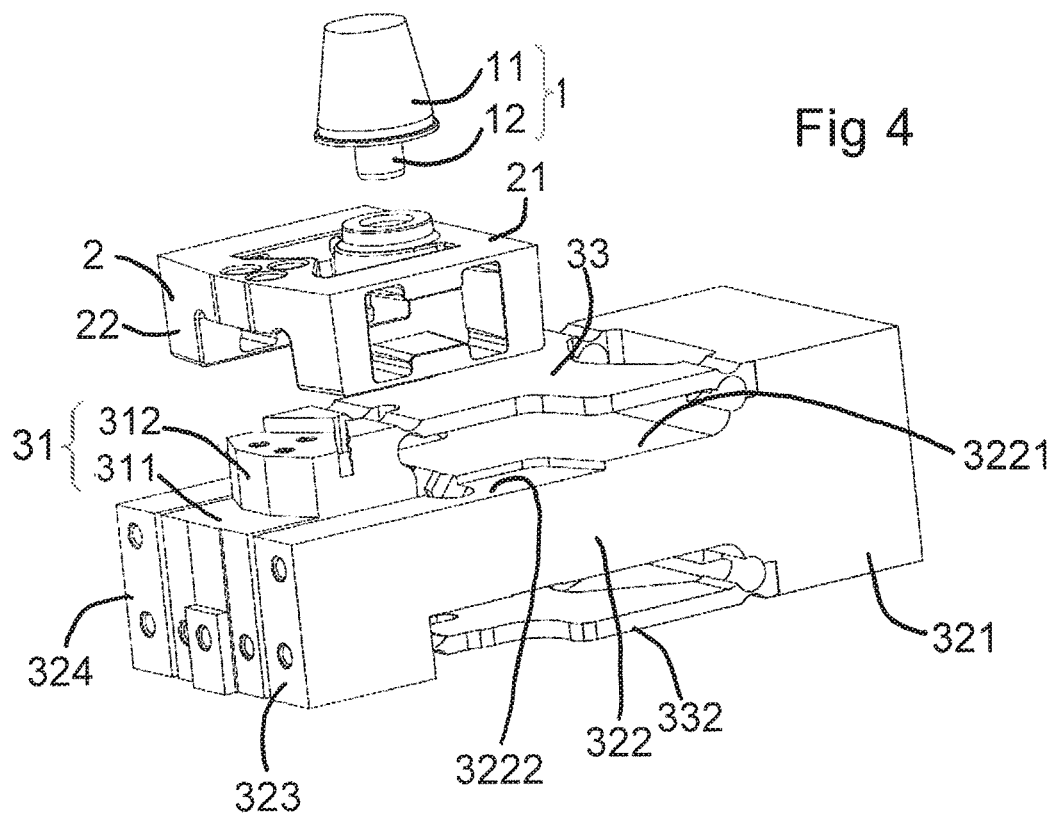
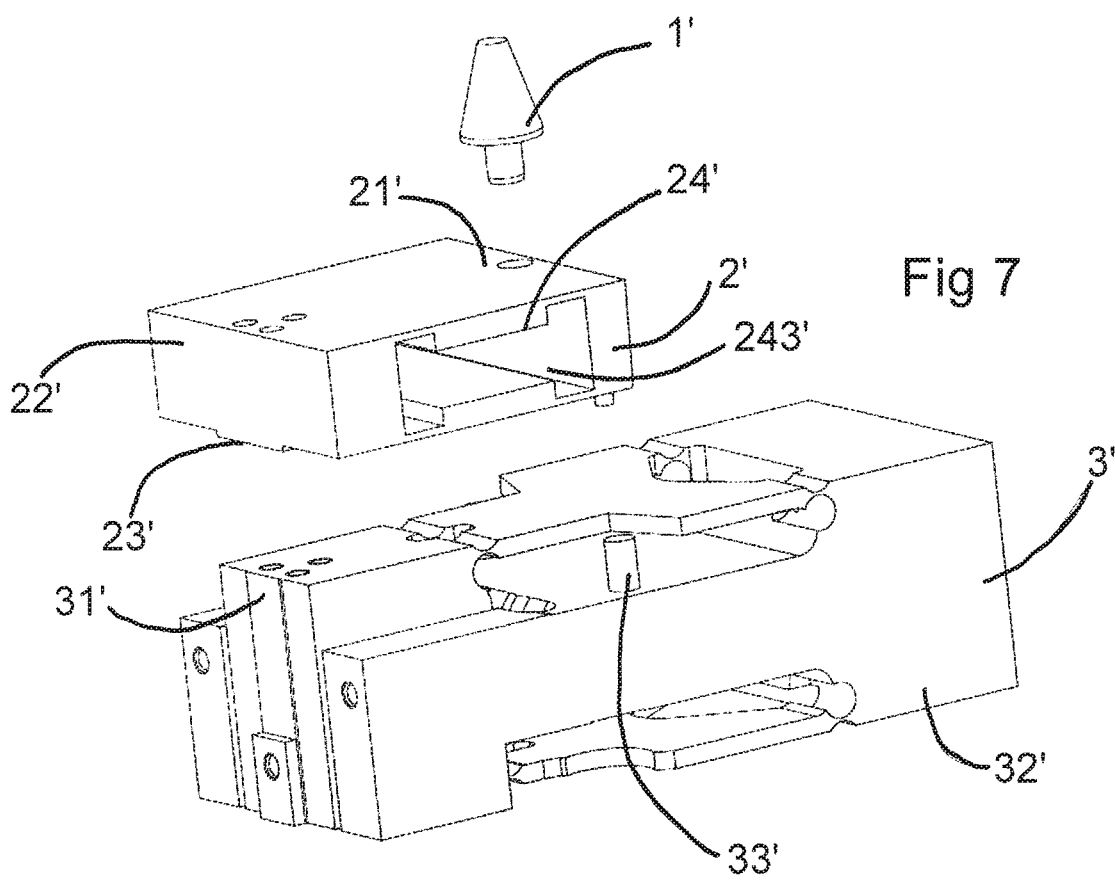

LOAD CELL WITH STREAMLINED STRUCTURE AND OVERLOAD PROTECTION

CROSS-REFERENCE TO RELATED APPLICATIONS

This application claims priority to PCT/EP2016/066237, filed on 8 Jul. 2016, which in turn claims priority to Chinese applications 201510415673.8 and 201520512666.5, each of which was filed on 15 Jul. 2015. The content of each of these applications is incorporated by reference as if fully recited herein.

TECHNICAL FIELD

The invention relates to a load cell having an overload protection and an electronic balance with a load cell having an overload protection.

BACKGROUND ART

In the prior art, during the use or the transport, if there is no overload protection or the overload protection is imperfect, the electronic balance can be easily damaged due to the effects of static or dynamic impact forces. U.S. Pat. No. 4,574,898 discloses a load cell with an overload protection, the load cell comprises a load-receiver member, a main member and a load-transmitting member connecting the load-receiver member to the main member. Because the load-transmitting member comprises some separate parts, the assembling increases work and cost of the product.

Hence, it is desired to have a load cell solving the problem above.

SUMMARY OF INVENTION

The object of this invention is to provide a load cell and an electronic balance that has simple structure, is easy to assemble and has an overload protection.

In accordance with the present invention, a load cell comprises a load receiving member, a main member and a load transmitting member and a stop portion. The main member comprises a movable portion, a fixed portion and a parallel guiding member for connecting the fixed portion and the movable portion. The load transmitting member comprises a first mounting portion for mounting the load receiving member, a second mounting portion for mounting the movable portion and a parallel guiding member for connecting the first mounting portion to the second mounting portion. The first mounting portion is movable vertically relative to the second mounting portion when a load being applied on the first mounting portion and the load transmitting member is a single piece. The load cell further comprises a stop portion for preventing the first mounting portion from further moving downwardly for overload protection.

Other objects, advantages and novel features of the present invention will become more apparent from the following detailed description of the present embodiment when taken in conjunction with the accompanying drawings.

BRIEF DESCRIPTION OF DRAWINGS

Details of the load cell according to the invention will be apparent from the description of the embodiments that are illustrated in the drawings, wherein:

FIG. 3 is a sectional view of the load cell;

FIG. 4 is an exploded view of the load cell;

FIG. 7 is an exploded view of the load cell according to the second embodiment of the invention;

FIG. 8 is a front view of the load cell of FIG. 7; and

DESCRIPTION OF EMBODIMENTS

Figure 1:
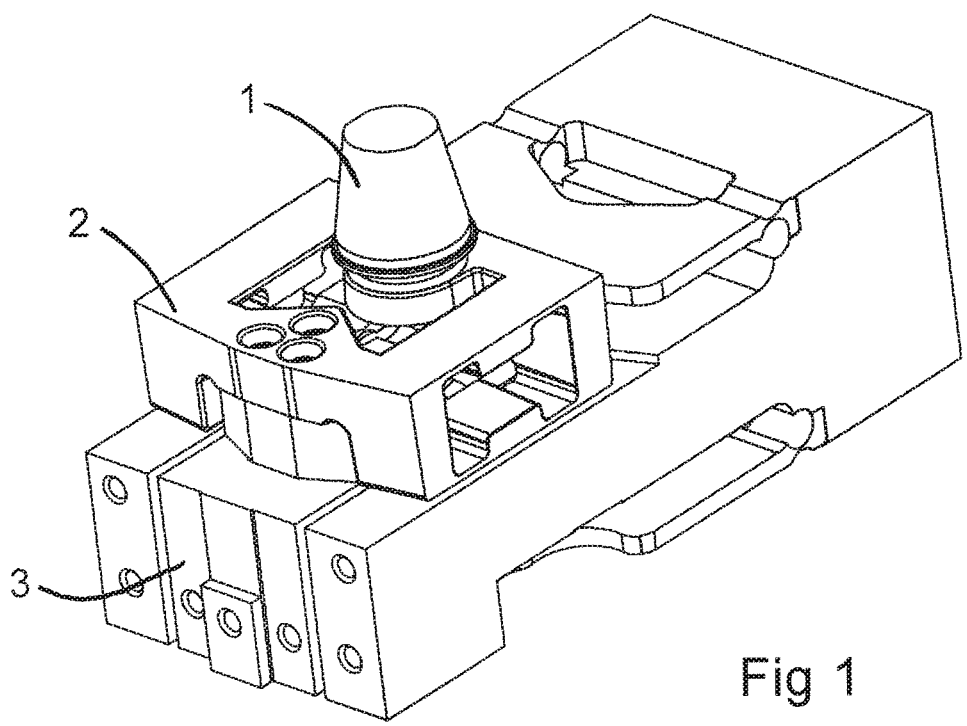
FIG. 1 is a perspective view of the load cell according to the present invention.
Figure 2:
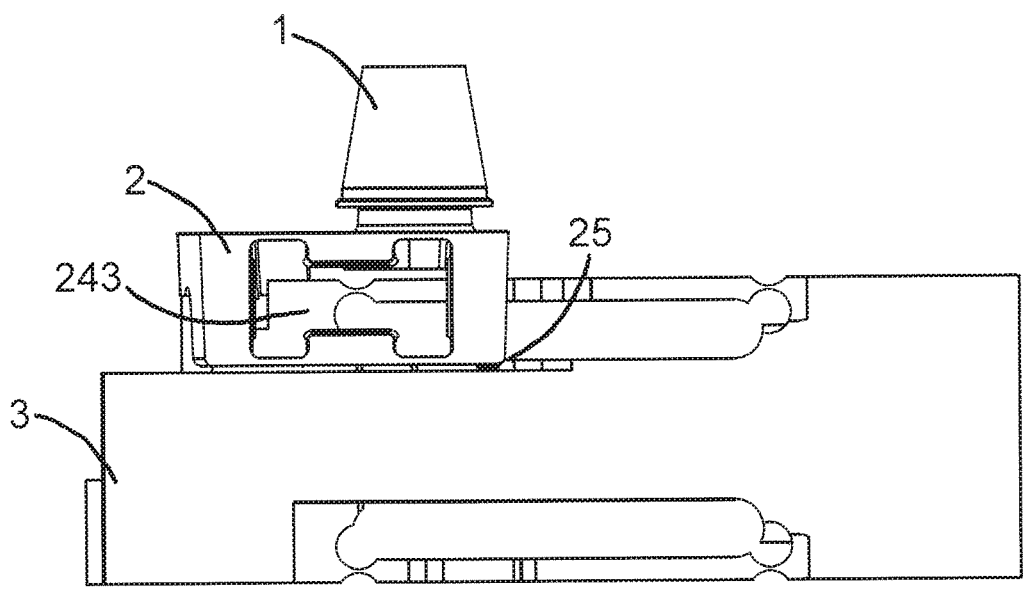
FIG. 2 is a front view of the load cell.

Within this description, relative directions refer to a load cell when used in mode for operation, wherein the forward direction is defined as the direction from the fixed portion to the movable portion, the vertical direction is defined as the direction that is perpendicular to the forward direction and essentially parallel to applied load, wherein the upward direction in the vertical direction is defined as the direction from a plane that is closer to the ground where on which the load cell is mounted to a plane that is more distant from the latter plane.

With reference to FIGS. 1 to 6, the invention provides a load cell. The load cell comprises a load receiving member 1, a main member 3, a load transmitting member 2 and a stop portion.

The load receiving member 1 comprises a base portion 11 and a cylindrical connecting portion 12 extending downwardly from the base portion 11.

The main member 3, 3' comprises a movable portion 31, 31', a fixed portion 32, 32' and a first parallel guiding member 33 for connecting the fixed portion 32, 32' to the movable portion 31, 31'. The first parallel guiding member 33 comprises a first upper parallel guiding plate 331, 331' and a first lower parallel guiding plate 332. Slots extending in the transverse direction are formed in the first guiding member 3, 3'. The slots are arc-shaped or square-shaped. In this embodiment, the slots are disposed at the two ends of the first upper parallel guiding member 331 and the first low parallel guiding plate 332.

The load transmitting member 2, 2' comprises a first mounting portion 21, 21' for mounting the load receiving member 1, 1', a second mounting portion 22, 22' for mounting the movable portion 31, 31' and a parallel guiding connection member 24, 24' for connecting the first mounting portion 21, 21' to the second mounting portion 22, 22'. The connection portion 12 is mounted to the first mounting portion 21, 21' for transmitting the force applied on the load receiving member 1, 1' to the load transmitting member 2, 2'. The load transmitting member 2, 2' is a single piece for having a simple structure and being easily assembled. The load transmitting member 2, 2' can be made by die-cast moulding, by machining or by both of them.

With reference to FIG. 3, the load transmitting member 2 is set above the main member 31, 32, 33 and extends in the X direction so that the load cell has a compact structure.

With reference to FIG. 4, the fixed portion 32 comprises an end portion 321, an extending portion 322 extending forwardly from the end portion 321 and the supporting portions 323, 324 extending forwardly from the extending portion 322. The supporting portions comprise a first supporting portion 323 and a second supporting portion 324.

The extending portion 322 defines a first upper surface 3221 extending horizontally and an upper surface 3222 lower than the first upper surface 3221 extending horizontally. In another embodiment, the first upper surface 3221 and the upper surface 3222 can be in the same plane.

In this embodiment, the extending portion 322 is a stop portion. When an overload is applied on the load receiving member 1, the bottom surface of the first mounting portion 21 abuts to the upper surface 322 for overload protection. At least a portion of the movable portion 31 is disposed in the space formed between the first supporting portion 323 and the second supporting portion 324.

Figure 5:
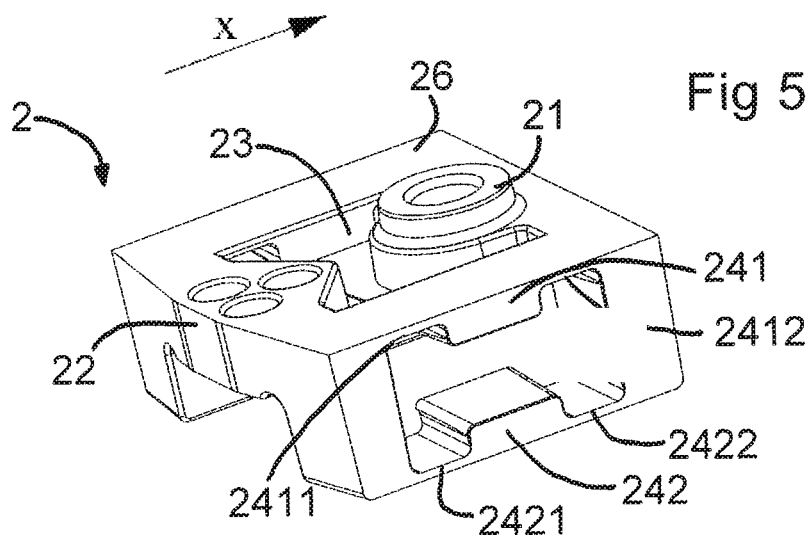
FIG. 5 is a perspective view of the load transmitting member.
Figure 6:
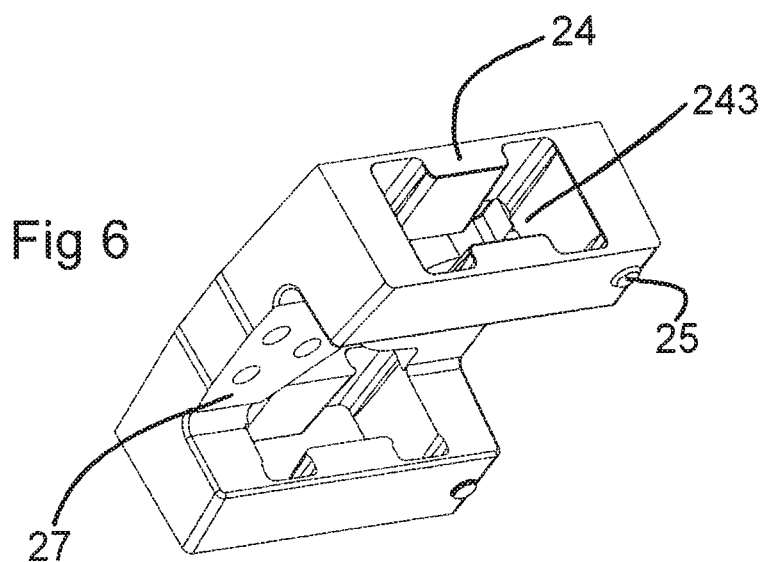
FIG. 6 is another perspective view of the load-transmitting member.

With reference to FIGS. 5 and 6, a second through hole 23 extending downwardly from the upper surface 26 of the load transmitting member 2 between the first mounting portion 21 and the second mounting portion 22, so that the load receiving member 2 has a smaller weight and the rigidity of the load-receiver member 2 is lower.

The parallel guiding connection member 24 comprises an upper parallel guiding connection plate 241 and a lower parallel guiding connection plate 242. A first through hole 243 extending horizontally in the transverse direction is formed between the upper parallel guiding connection plate 241 and the lower parallel guiding connection plate 242. The first through hole 243 is "H" shaped. The upper parallel guiding connection plate 241 comprises a first slot 2411 and a second slot 2412. The lower parallel guiding connection plate 242 comprises a third slot 2421 corresponding to the first slot 2411 and a forth slot 2422 corresponding to the second slot 2412. When a load is applied on the load receiving member 1, the bottom surface of the first mounting portion 21 moves downwardly. Because of the parallel guiding connection member 24, no matter of a center load or an eccentric load, the first mounting portion 21 can only move in the vertically downward direction, so that the force of the center load and eccentric load is closer to each other. This can prevent the load cell from introducing an eccentric load into the movable member.

The load transmitting member 2 comprises a third through hole 27 extending in the X direction whereby the third through hole 27 has an opening facing downwardly.

In the exemplary embodiment, the first mounting portion 21, 21' comprises protruding portions 25, 25' extending vertically and downwardly. When a load is applied on the load receiver member 1, 1', the first mounting portion 21, 21' moves downwardly. The first mounting portion 21, 21' can only produce a vertical downward displacement because of effect of the parallel guiding member 24, 24'. When the load exceeds the predefined maximum, the protruding portions 25 abut to the upper surface 3222 for overload protection.

The movable portion 31 comprises a body portion 311 and an attaching portion 312 extending upwardly from the body portion 311. The load transmitting member 2 is mounted on the attaching portion 312 and at least a portion of the attaching portion 312 is disposed in the third through hole 27, so that the load cell can have a small volume.

Figure 9:
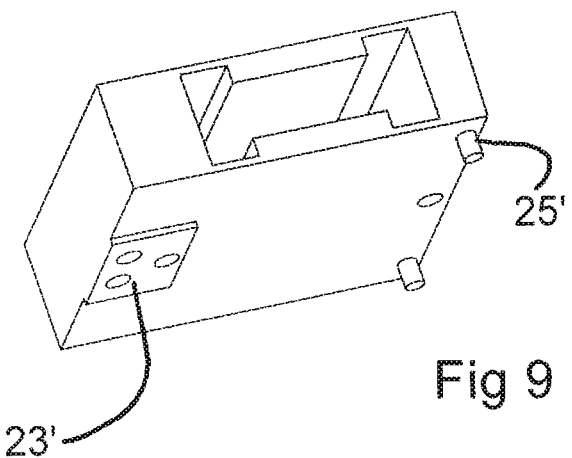
FIG. 9 is a perspective view of the load transmitting member of FIG. 7.

FIGS. 7 and 9 illustrate another embodiment of this invention. The load transmitting member 2' comprises a first mounting portion 21' for mounting the load receiving member 1', a second mounting portion 22' and a parallel guiding member 24' for connecting the first mounting portion 21' to the second mounting portion 22'. The parallel guiding connection member is divided by the first through hole 243'. The first through hole 243' is H shaped. The load transmitting member 2' comprises a protruding portion 23' and protruding portions 25' extending downwardly. The protruding portion 23' is below the second mounting portion 22' and the protruding portions 25' are disposed on the lower surface of the first mounting portion 21'. The protruding portions 25' are protruding on both sides of the first upper parallel guiding plate 331' to the stop portion. The protruding portions 23' is to fix the load transmitting member 2' onto the movable portion 31'. A distance is formed between the lower surface of the load transmitting member 2' and the upper surface of the main member 3' for vertical displacement of the load transmitting member 2'. In the exemplary embodiment, a pair of protruding posts 33' extends upwardly from the fixed portion 32'. The protruding posts 33' are arranged below the protruding portions 25'. When overload is applied on the load receiving member 1', the protruding portions 25' abut on the protruding posts 33' to protect the load cell. The protruding posts 33' are square shaped or other shaped.

As persons skilled in this art may well appreciate, the above description of the preferred embodiment of the present invention is employed for the description, not for the restriction to the present invention. Modifications to the outlined embodiment of the present invention may be apparent and should be considered to be within the scope of the present invention that is recited in the claims.

What is claimed is:

1. A load cell for an electronic balance, comprising:
    a load receiving member;
    a main member that comprises:
    a movable portion,
    a fixed portion that comprises an end portion and an extending portion that extends forwardly from the end portion toward the movable portion; and
    a parallel guiding member that connecting the fixed portion to the movable portion, such that the movable portion is movable vertically relative to the fixed portion when a load is applied on the movable portion; and
    a load transmitting member, formed of a single piece of a solid material with a longitudinally-extending through hole formed therein that extends in a longitudinal direction and has a downward opening when the load cell is in an operational mode, the load transmitting member comprising:
    a first mounting portion for mounting the load receiving member,
    a second mounting portion for mounting the load transmitting member to the movable portion; and
    a parallel guiding connection member for connecting the first mounting portion to the second mounting portion, such that the first mounting portion is movable vertically relative to the second mounting portion when a load being applied on the first mounting portion, and
    wherein the extending portion of fixed portion serves as a stop portion by preventing the first mounting portion from further moving downwardly, providing protection against overload.

2. The load cell of claim 1, wherein the load transmitting member is set above the main member when the load cell is in an operational mode.

3. The load cell of claim 2, wherein the parallel guiding connection member comprises:
    an upper parallel guiding connection plate,
    a lower parallel guiding connection plate; and
    wherein the parallel guiding connection member has a transverse through hole formed therein with an "H"-shape that extends horizontally in a transverse direction between the upper parallel guiding connection plate and the lower parallel guiding connection plate when the load cell is in an operational mode.

4. The load cell of claim 3, wherein the load transmitting member has a downwardly-extending through hole formed therein and disposed between the first mounting portion and the second mounting portion, the downwardly-extending through hole extending downwardly when the load cell is in an operational mode.

5. The load cell of claim 1, wherein the parallel guiding connection member comprises:
   an upper parallel guiding connection plate,
   a lower parallel guiding connection plate; and
   wherein the parallel guiding connection member has a transverse through hole formed therein with an "H"-shape that extends horizontally in a transverse direction between the upper parallel guiding connection plate and the lower parallel guiding connection plate when the load cell is in an operational mode.

6. The load cell of claim 1, wherein the load transmitting member has a downwardly-extending through hole formed therein and disposed between the first mounting portion and the second mounting portion, the through hole extending downwardly when the load cell is in an operational mode.

7. The load cell according to claim 1, wherein the movable portion comprises:
   a body portion; and
   an attaching portion that extends upwardly from the body portion, the load transmitting member being mounted thereon;
   wherein at least a portion of the attaching portion is disposed in the longitudinally-extending through hole.

8. The load cell of claim 1, wherein the parallel guiding connection member comprises;
   an upper parallel guiding connection plate; and
   a lower parallel guiding connection plate;
   wherein at least a portion of the lower parallel guiding connection plate is disposed in the longitudinally-extending third through hole.

9. The load cell of claim 1, wherein:
   the first mounting portion has two protruding portions extending downwardly therefrom, the two protruding portions disposed on both sides thereof.

10. An electronic balance comprising a load cell according to claim 1.

* * * * *

UNITED STATES PATENT AND TRADEMARK OFFICE
CERTIFICATE OF CORRECTION

PATENT NO. : 10,612,965 B2
APPLICATION NO. : 15/835514
DATED : April 7, 2020
INVENTOR(S) : Yang et al.

Page 1 of 1

It is certified that error appears in the above-identified patent and that said Letters Patent is hereby corrected as shown below:

On the Title Page

Item (30), Foreign Application Priority Data, please delete "Jul. 15, 2015 (CN) 2015 1 0415673
Jul. 15, 2015 (CN) 2015 2 0512666 U" and insert -- Jul. 15, 2015 (CN) 201510415673.8
Jul. 15, 2015 (CN) 201520512666.5 --.

In the Claims

In Column 6, Line 15, Claim 8, please delete "extending third through hole" and insert -- extending through hole --.

Signed and Sealed this
Sixth Day of October, 2020

Andrei Iancu
*Director of the United States Patent and Trademark Office*